US012416274B2

(12) United States Patent
Ehleskog et al.

(10) Patent No.: US 12,416,274 B2
(45) Date of Patent: Sep. 16, 2025

(54) CYLINDER HEAD

(71) Applicant: Volvo Truck Corporation, Gothenburg (SE)

(72) Inventors: Rickard Ehleskog, Hisings Backa (SE); Gustavo Hindi, Surte (SE); Tommy Simonsson, Stenungsund (SE); Oscar Garnemark, Torslanda (SE); Jan Eismark, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/795,363

(22) Filed: Aug. 6, 2024

(65) Prior Publication Data

US 2025/0067229 A1 Feb. 27, 2025

(51) Int. Cl.

*F02B 5/00* (2006.01)
*F02D 19/06* (2006.01)
*F02F 1/24* (2006.01)
*F02M 21/02* (2006.01)

(52) U.S. Cl.

CPC ............ *F02F 1/24* (2013.01); *F02D 19/0644* (2013.01); *F02M 21/0275* (2013.01)

(58) Field of Classification Search

CPC .. F02B 19/12; F02B 2075/125; F02B 17/005; F02B 23/101; F02M 21/0275; F02M 21/02; F02D 41/0027

USPC .......................................................... 123/305

See application file for complete search history.

(56) References Cited

U.S. PATENT DOCUMENTS

| | | | | |
|---|---|---|---|---|
| 9,605,585 | B2 | 3/2017 | Bezner et al. | |
| 11,674,464 | B2 * | 6/2023 | Zhang | F02D 41/40 701/105 |
| 2015/0096530 | A1 * | 4/2015 | Bzymek | F02M 43/00 123/294 |
| 2020/0003173 | A1 * | 1/2020 | Shah | F02P 5/151 |
| 2022/0018321 | A1 * | 1/2022 | Kolhouse | F02B 1/10 |

(Continued)

FOREIGN PATENT DOCUMENTS

| | | | |
|---|---|---|---|
| EP | 1548248 | A2 | 6/2005 |
| JP | 403253763 | A | 11/1991 |

(Continued)

OTHER PUBLICATIONS

Extended European Search Report, European Application No. 23192426.7, mailed Feb. 8, 2024, 6 pages.

*Primary Examiner* — Logan M Kraft
*Assistant Examiner* — James J Kim
(74) *Attorney, Agent, or Firm* — Sage Patent Group

(57) ABSTRACT

The present disclosure relates to a cylinder head configured to mount to a combustion cylinder of an internal combustion engine, ICE, the cylinder head including a cylinder head surface configured to face an internal combustion chamber of the combustion cylinder, a cavity including an inner cavity surface and a cavity side wall, the cavity extending from the cylinder head surface, along the cavity side wall, to the inner cavity surface in a direction away from the cylinder head surface, and an opening arranged in the inner cavity surface, the opening being configured to be provided with a fuel injector for feeding gaseous fuel into the combustion chamber, wherein the cavity side wall includes a surface discontinuity portion, the surface discontinuity portion being arranged at a distance from the inner cavity surface.

13 Claims, 6 Drawing Sheets

(56) References Cited

U.S. PATENT DOCUMENTS

| | | | | |
|---|---|---|---|---|
| 2022/0112835 | A1* | 4/2022 | Bunce | F02M 21/0278 |
| 2024/0133350 | A1* | 4/2024 | Eichhorn | F02F 1/242 |

FOREIGN PATENT DOCUMENTS

| | | | |
|---|---|---|---|
| JP | 407238835 | A | 9/1995 |
| JP | 2013011265 | A | 1/2013 |
| WO | 2004099584 | A1 | 11/2004 |
| WO | 2008041241 | A2 | 10/2008 |
| WO | 2014098644 | A1 | 6/2014 |

* cited by examiner

CYLINDER HEAD

CROSS REFERENCE TO RELATED APPLICATIONS

This application claims priority to European Patent Application No. 23192426.7, filed on Aug. 21, 2023, the disclosure and content of which is incorporated by reference herein in its entirety.

TECHNICAL FIELD

The disclosure relates generally to internal combustion engines. In particular aspects, the disclosure relates to a cylinder head for a combustion cylinder of an internal combustion engine. The disclosure can be applied to heavy-duty vehicles, such as trucks, buses, and construction equipment, among other vehicle types. Although the disclosure may be described with respect to a particular vehicle, the disclosure is not restricted to any particular vehicle. The disclosure may also be applicable to non-moving internal combustion engines, such as e.g., stationary combustion engines used for generating electric power.

BACKGROUND

Hydrogen internal combustion engines are becoming a desired alternative to conventional internal combustion engines consuming petrol or diesel. For such hydrogen internal combustion engines, hydrogen gas is injected into a combustion chamber. The hydrogen injector injecting the hydrogen is typically run at critical conditions at which the hydrogen flow becomes sonic or even locally supersonic. One problem with this type of flow is difficulties to maintain the initial direction of the jet out of the injector.

There is thus a desire to improve the guidance of the hydrogen flow into the combustion chamber.

SUMMARY

According to a first aspect of the disclosure, there is provided a cylinder head configured to mount to a combustion cylinder of an internal combustion engine, ICE, the cylinder head comprising a cylinder head surface configured to face an internal combustion chamber of the combustion cylinder, a cavity comprising an inner cavity surface and a cavity side wall, the cavity extending from the cylinder head surface, along the cavity side wall, to the inner cavity surface in a direction away from the cylinder head surface, and an opening arranged in the inner cavity surface, the opening being configured to be provided with a fuel injector for feeding gaseous fuel into the combustion chamber, wherein the cavity side wall comprises a surface discontinuity portion, the surface discontinuity portion being arranged at a distance from the inner cavity surface.

The surface discontinuity portion should be understood in such a way that the cavity side wall is provided with a surface portion that changes or interrupts the continuity of the cavity side wall. The surface discontinuity portion is thus a change in the surface structure of the cavity side wall. As will be evident from the below description, the surface discontinuity portion may be a protrusion of the cavity side wall that protrudes from the cavity side wall and interrupts the continuity of the cavity side wall. As another example, the surface discontinuity portion may be a recess of the cavity side wall that interrupts the continuity of the cavity side wall.

A technical benefit may include that the gaseous fuel injected by the fuel injector can be guided into the combustion chamber of the combustion cylinder in a desired direction. By guiding the gaseous fuel in a specific direction may improve the combustion process in the combustion chamber. The cylinder head described above is thus advantageous for a hydrogen internal combustion engine. In particular, the injection of hydrogen fuel may be performed at a lower pressure level compared the injection of e.g., diesel or petrol. Due to the low injection pressure, it may be difficult to guide the hydrogen fuel in the desired direction, and the present disclosure thus present a solution to this problem by forming the cavity side wall with the surface discontinuity portion. Further, by forming the cavity in the cylinder head, i.e., as an indentation in the cylinder material, there is a reduced need to provide any additional nozzle cap with a specific shape that obtains a desired direction of the gaseous fuel into the combustion chamber.

Optionally, an envelope surface of the cavity side wall may extend 360 degrees in a circumferential direction. A technical benefit may include that a substantially uniform distribution of gaseous fuel can be directed into the combustion chamber.

Optionally, the surface discontinuity portion may be integrated with the cavity side wall. A technical benefit may include that no additional material may be needed to achieve the above defined technical advantages. However, other alternatives are conceivable. For example, the surface discontinuity portion may be arranged on a sleeve, which sleeve is fixated to the cavity side wall. In such situation, the sleeve may be formed by a material of higher strength compared to the material of the cylinder head such that the surface discontinuity portion can withstand the stress concentrations generated by the flow of gaseous fuel.

Optionally, the surface discontinuing portion may comprise a protrusion. A technical benefit may include that a protrusion may efficiently redirect the flow in a desired direction into the combustion chamber.

Optionally, the protrusion may be arranged at an interface between the cylinder head surface and the inner cavity surface, the protrusion extending towards a center portion of the cavity. A technical benefit may include that the flow of gaseous fuel is redirected in a desired direction just before leaving the cylinder head, i.e., at a top end of the combustion chamber.

Optionally, the protrusion may extend in 360 degrees at the cavity side wall. A technical benefit may include that a uniform redirection of the gaseous fuel may be obtained.

Optionally, the protrusion may be flush with the cylinder head surface. A technical benefit may include that the protrusion is not protruding towards the combustion chamber and the risk of piston interaction with the protrusion is avoided. By "flush" should be construed that a portion of the protrusion is arranged in the same geometric plane as the cylinder head surface.

Optionally, the protrusion may be arranged at a non-zero distance from the cylinder head surface. A technical benefit may include that the flow of gaseous fuel is redirected in a desired direction a distance from the cylinder head surface, i.e., somewhere between the cylinder head surface and the inner cavity surface. The protrusion does in this example not comprise a portion which is flush with the cylinder head surface, i.e., arranged in the same geometric plane as the cylinder head surface.

Optionally, the surface discontinuity portion may comprise at least one recess arranged in the cavity side wall. A technical benefit may include that at least one recess may provide desired direction of gaseous fuel into the combustion chamber. Optionally, the at least one recess may comprise a plurality of recesses.

Optionally, the recesses of the plurality of recesses may be evenly distributed in the circumferential direction of the cavity side wall. A technical benefit may include that an even distribution of redirected gaseous fuel may be provided into the combustion chamber.

Optionally, the recess may extend from the cylinder head surface in a direction towards the inner cavity surface. Optionally, the recess may extend into the cylinder head surface. A technical benefit may include that the gaseous fuel is controlled to be guided in a desired direction.

Optionally, the cavity may be arranged at a center of the cylinder head surface.

Optionally, the cavity may comprise a circular cross-section. Other cross-sections are however also conceivable, such as e.g., elliptical or oval.

Optionally, the cylinder head may be a hydrogen internal combustion engine cylinder head.

According to a second aspect, there is provided an internal combustion engine, ICE, comprising a combustion cylinder housing a reciprocating piston, a cylinder head according to any one of the above examples of the first aspect, the cylinder head being mounted to the combustion cylinder, and a fuel injector arranged at inner cavity surface of the cavity.

Optionally, the internal combustion engine may be a hydrogen internal combustion engine. A technical benefit may include, as described above, that the low pressure injected hydrogen gas can be guided in a desired direction by the shape of the cylinder head, and in particularly the shape of the cavity.

Effects and features of the second aspect are largely analogous to those described above in relation to the first aspect.

According to a third aspect, there is provided a vehicle, comprising an internal combustion engine according to any one of the examples of the second aspect.

Optionally, the vehicle may further comprise a gas tank configured to contain hydrogen gas, wherein the gas tank is arranged in fluid communication with the fuel injector.

Effects and features of the third aspect are largely analogous to those described above in relation to the first and second aspects.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The disclosure described in the following may seek to mitigate the problem of properly directing pressurized fluid into a combustion chamber of an internal combustion engine. The present disclosure is applicable for injection of fluid at pressure levels in a wide variety of pressure range, such as from low pressure injection, e.g., below 30 bar, to high pressure levels, e.g., up to 300 bar. A technical benefit may include that the pressurized fuel from a fuel injector can be guided to a desired position within the combustion chamber for improving the combustion process within the combustion chamber.

Figure 1:
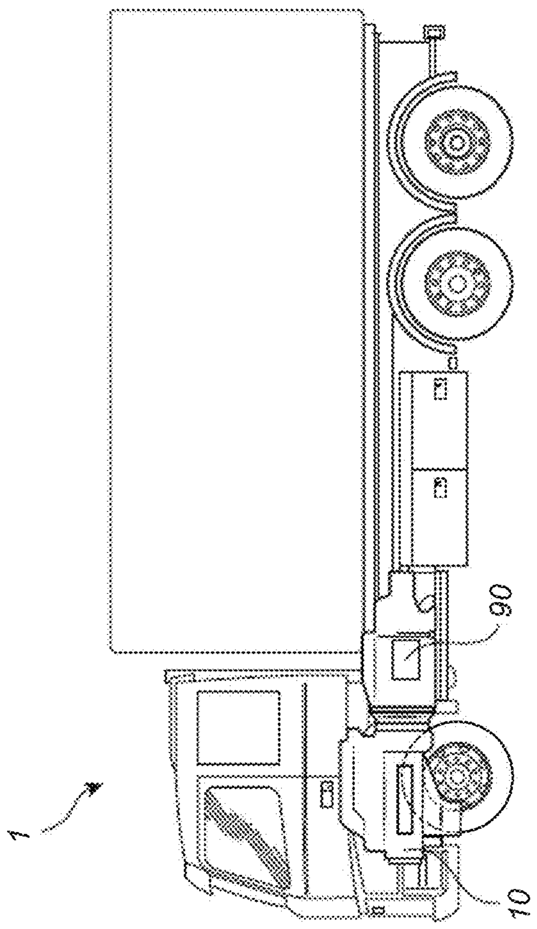
FIG. 1 is an exemplary illustration of a vehicle in the form of a truck according to an example.

Reference is made to FIG. 1, which is an exemplary illustration of a vehicle 1 in the form of a truck according to an example. The vehicle 1 comprises an internal combustion engine, ICE, 10 for powering and driving the vehicle 1. The ICE 10 in FIG. 1 is a hydrogen internal combustion engine, or also referred to as a hydrogen piston ICE. The combustion in such hydrogen ICE is based on a combustion of air and hydrogen. The hydrogen, or hydrogen fuel, can be combusted in an internal combustion engine over a wide range of fuel-air mixtures. A hydrogen ICE may be operated to produce very low emissions during certain conditions. The hydrogen ICE may operate based on hydrogen liquid or hydrogen gas.

The truck 1 may be a hybrid electric vehicle. By way of example, the hybrid electric vehicle comprises an electric propulsion system having at least one high-voltage battery and at least one electric machine, as well as the hydrogen ICE 10. The hydrogen ICE 10 of the truck 1 further comprises a fuel injection arrangement as will be disclosed herein with reference to FIG. 2. By way of example, the fuel injection arrangement is a fuel gas injection arrangement configured to directly inject hydrogen gas fuel into a combustion chamber 15 of the ICE 20, as may be gleaned from FIG. 2.

Figure 2:
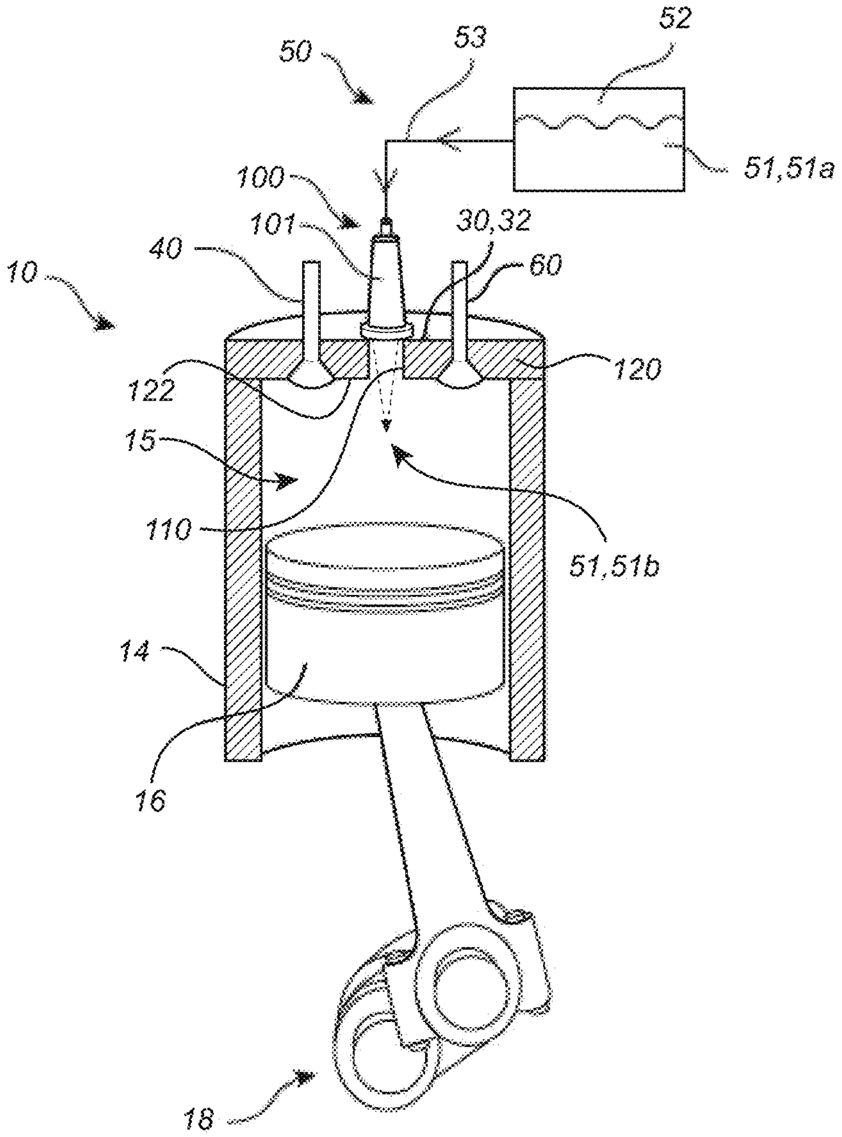
FIG. 2 is an exemplary cut-out view of an internal combustion engine according to an example.

As depicted in FIG. 1, the ICE 10 further comprises a control unit 90. The control unit 90 is arranged in communication with the components of the ICE 10, in particular the fuel injection arrangement 100 (FIG. 2). The control unit 90 is hence configured to control the fuel injector arrangement 100. The control unit 90 may also communicate or be an integral part of a main electronic control unit for controlling the vehicle and various parts of the vehicle.

Turning now to FIG. 2, which is a schematic illustration of a hydrogen internal combustion engine 10 according to an example embodiment. The fuel injection arrangement 100 is a fuel gas injection arrangement having a fuel injector 101 arranged at cavity 110 of a cylinder head 120 of the ICE 10. In particular, the cylinder head 120 comprises a cylinder head surface 122 facing a combustion chamber 15, where the cavity 110 extends from the cylinder head surface 122 in a direction away from the combustion chamber 15.

FIG. 2 only depicts a single cylinder 14 having a combustion chamber 15 and a reciprocating piston 16 arranged therein. The piston 16 may comprise a piston bowl (not shown) facing the injector. In such a case, the flow of hydrogen is directed towards the piston bowl. Although FIG. 2 depicts a single cylinder, the ICE 10 generally comprises a plurality of cylinders 14 operated to combust fuel 51, such as hydrogen gas, whereby the motion of pistons 16 reciprocating in the cylinders 14 is transmitted to a rotation movement of a crank shaft 18. The crank shaft 18 is further coupled to a transmission (not shown) for providing a torque to driving elements (not shown). In case of a heavy-duty vehicle, such as a truck, the driving elements are wheels; however, the ICE 10 may also be used for other equipment such as construction equipment, marine applications, etc.

Generally, each cylinder 14 is provided with a corresponding piston 16 connected to the crankshaft 18 of the ICE 10. The ICE 10 further comprises an intake manifold (not shown) forming intake guides arranged to guide air to the cylinders 14, and an exhaust guide (not shown) arranged to guide gases from the cylinders 14.

Each cylinder 14 may further comprise at its vertical top end at least one, typically a multiple number of inlet channels having at least one inlet valve 40 for controlling a flow of the inlet air to the combustion chamber 15, and at least one, typically a multiple number of exhaust channels having a least one exhaust valve 60 for controlling discharge of exhaust gases produced from the fuel combustion process taking place within the cylinder 14.

Each one of the cylinders 14 defines at least partly a combustion chamber 15. As is also common, one end of the cylinder cavity is closed by the cylinder head 120. The piston 16 reciprocates in the cylinder and is connected to the crankshaft 18 so that the piston is set to reverse in the cylinder at an upper dead center position and at a lower dead center position.

The ICE 10 here further comprises a fuel system 50. As illustrated in FIG. 2, the fuel system 50 defines a common fuel line 53 and is configured to supply hydrogen gas to one or more cylinder(s) 16 by means of one or more fuel injection arrangement(s) 100. Optionally, the fuel system 50 may include the plurality of fuel injection arrangements 100. Alternatively, the fuel injection arrangements 100 may be separate parts arranged in fluid communication with the fuel system 50. The number of fuel injection arrangements 100 may be equal to the numbers of cylinders of the ICE 10. The fuel injection arrangements 100 are arranged in fluid communication with the fuel line 53 of the fuel system 50.

The fuel system 50 here also comprises a fuel tank 52 containing the hydrogen fuel 51 in gaseous form 51*a*. The fuel 51 may also be partly arranged in liquid form in the fuel tank 52. The fuel 51 in the form of gaseous hydrogen 51*a* is supplied to the fuel injection arrangement 100 of the ICE 10 from the fuel tank 52 via the fuel circuit 53 of the fuel system 50. The fuel circuit 53 is arranged and configured to contain and transport the fuel, as illustrated by the arrows in FIG. 2, and may optionally include one or more additional fuel system components such as a fuel pump, fuel filter etc. These components are of conventional types and thus not further described or illustrated for simplifying the disclosure for the reader.

In addition, the ICE 10 may comprise an ignition source 30. The ignition source 30 is arranged in the cylinder and at a location facing the combustion chamber 15, as illustrated in FIG. 2. By way of example, the ignition source 30 (not shown in detail, merely an example of its position) is arranged at an upper end of the combustion cylinder and spaced apart from the fuel injector 100. Other arrangements of the ignition source and the fuel injector are also conceivable. For example, the fuel injector 100 can be arranged on one side, radially spaced apart from the axial center, and the ignition source on the other side of the axial center.

The ignition source 30 is configured to ignite hydrogen gas jets 51*b* supplied via the fuel injection arrangement 100. By way of example, the ignition source 30 is a sparkplug 32. A sparkplug is a device for delivering electric current from an ignition system to the combustion chamber of a spark-ignition engine to ignite the compressed fuel/air mixture by an electric spark. Typically, in each cylinder 14, there is a corresponding sparkplug arranged to ignite a mix of fuel and oxygen in the given cylinder. The hydrogen fuel is generally compressed to a certain level with air. The compressed air-fuel mixture is thus ignited by the sparkplug.

Figure 3A:
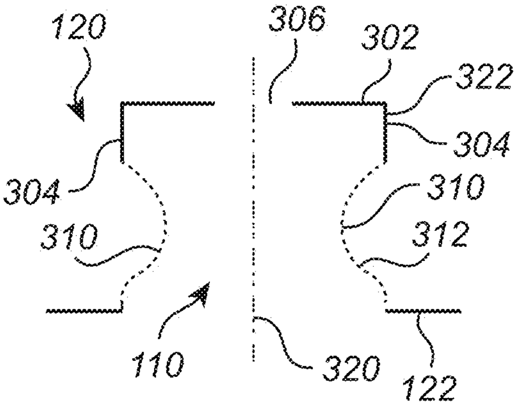
FIGS. 3A-3B are schematical examples of a cavity in the cylinder head.
Figure 3B:
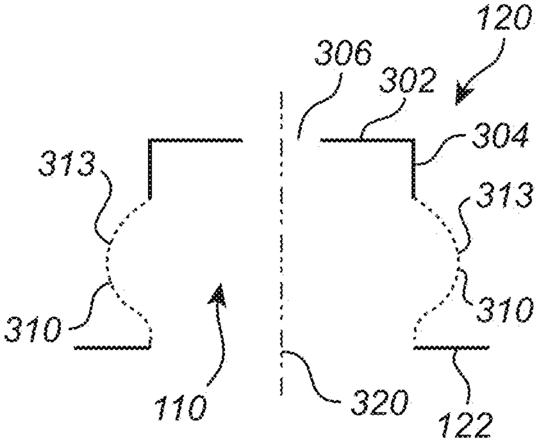

In order to describe the above described cavity 110 in further detail, reference is now made to FIGS. 3A-3B which schematically illustrate examples of the cavity 110 in the cylinder head 120. In detail, FIGS. 3A-3B are cross-sections of the cylinder head 120 and illustrate examples of the cavity 110. With initial reference to FIG. 3A, the cylinder head comprises the above defined cylinder head surface 122. The cylinder head surface 122 faces the combustion chamber (15 in FIG. 2). The cavity 110 comprises an inner cavity surface 302 and a cavity side wall 304. In detail, the cavity 110, which in FIG. 3A forms an integral part of the cylinder head 120, extends from the cylinder head surface 122, along the cavity side wall 304, the inner cavity surface 302. Further, an opening 306 is arranged in the inner cavity surface 302. The opening 306 is arranged to receive the above described injector 101. Put it differently, the injector 101 is configured to be attached to the cylinder head 120 at the opening 306.

Moreover, the cavity side wall 304 comprises a surface discontinuing portion 310. The surface discontinuing portion 310 is a portion of the cavity side wall 304 that interrupts the continuity of the cavity side wall 304. The exemplified surface discontinuing portion 310 in FIG. 3A is a protrusion 312 protruding towards a center axis 320 of the cavity 110. The protrusion is arranged at a non-zero distance from the cylinder head surface. In the exemplified FIG. 3A, the protrusion 312 thus interrupts the straight portion 322 of the cavity side wall 304. When the injector (101 in FIG. 2) injects a flow of fuel, the surface discontinuing portion 310, i.e., the protrusion 312 in FIG. 3A will guide the flow to a desired position within the combustion chamber. In the specific example, the fuel will be guided in a direction towards the center axis 320.

Turning now to FIG. 3B which illustrates the cavity 110 according to another example. In FIG. 3B, the cylinder head 120 also comprises the above defined cylinder head surface 122. The cylinder head surface 122 faces the combustion chamber (15 in FIG. 2). In a similar vein as for FIG. 3A, the cavity 110 also comprises the inner cavity surface 302 and the cavity side wall 304. The cavity 110, which also in FIG. 3B forms an integral part of the cylinder head 120, extends from the cylinder head surface 122, along the cavity side wall 304, the inner cavity surface 302. An opening 306 arranged to receive the above described injector 101 is also arranged in the inner cavity surface 302.

In a similar vein as for the example depicted in FIG. 3A, the cavity side wall 304 also comprises a surface discontinuing portion 310. Again, the surface discontinuing portion 310 is a portion of the cavity side wall 304 that interrupts the continuity of the cavity side wall 304. Contrary to the example depicted in FIG. 3A, the exemplified surface discontinuing portion 310 in FIG. 3B is a recess 313 in the cavity side wall. The recess 313 extends away from the center axis 320 of the cavity 110. The recess 313 is arranged at a non-zero distance from the cylinder head surface. In the exemplified FIG. 3B, the recess 313 thus interrupts the straight portion 322 of the cavity side wall 304. When the injector (101 in FIG. 2) injects a flow of fuel, the fuel will flow into the recess 313 and directed to a desired position in the combustion chamber. In particular, the fuel will flow along the surface of the recess 313 and be guided in a direction towards the center axis 320.

Figure 4A:
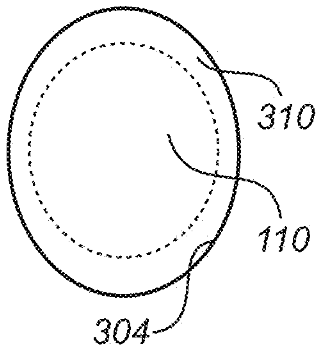
FIGS. 4A-4B are schematical examples from below of surface discontinuing portions of the cavity side wall.
Figure 4B:
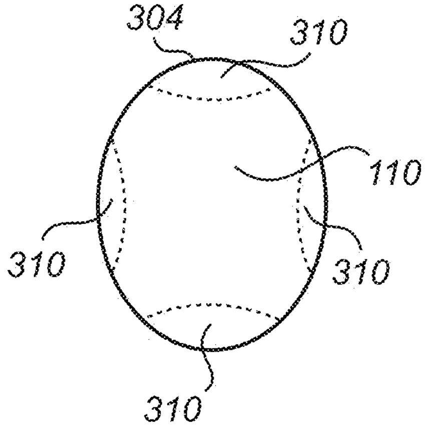

The surface discontinuing portion 310 may be designed in different shapes and reference is now made to FIGS. 4A and 4B which illustrate two different examples. Both FIG. 4A as well as FIG. 4 are cross-sectional views seen from below/above. In detail, the cross-sectional views in FIGS. 4A and 4B are views seen from the injector towards the cylinder head surface or vice versa. As can be seen in FIG. 4A, the surface discontinuing portion 310 extends circumferentially around the entire cavity side wall 304, i.e., 360 degrees in the circumferential direction. The surface discontinuing portion 310 is thus continuous in the circumferential direction. In FIG. 4B on the other hand, the surface discontinuing portion 310 is arranged as intermittent portions, i.e., intermittent surface discontinuing portions 310. FIG. 4B illustrates four separately arranged surface discontinuing portions 310 around the cavity side wall 304, although a higher or lower number of separately arranged surface discontinuing portions 310 are conceivable. The surface discontinuing portion 310 in FIG. 4B is thus discontinuous in the circumferential direction. It should be readily understood that the examples depicted in FIGS. 4A and 4B are applicable for the example depicted in FIG. 3A as well as the example depicted in FIG. 3B. In other words, the extension of the discontinuing portion 310 depicted in FIGS. 4A and 4B are applicable both for discontinuing portions in the form of a protrusion 312 as well as in the form of a recess 313.

Figure 5A:
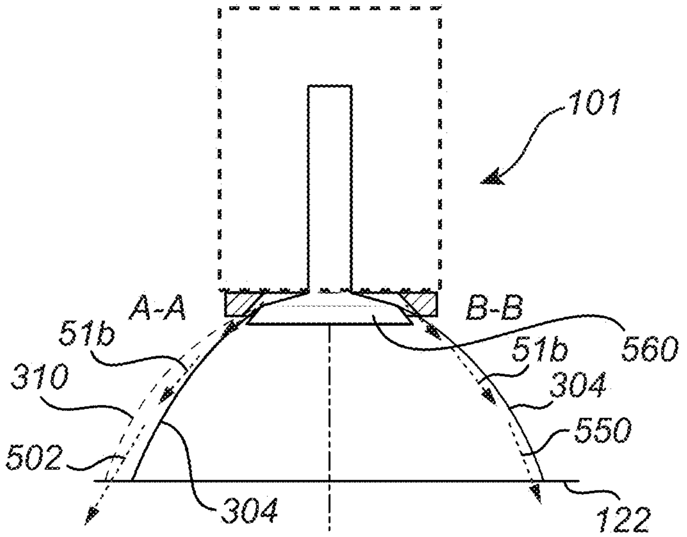
FIGS. 5A-5B is a schematical example of a surface discontinuing portion in the form of recesses seen in various views.
Figure 5B:
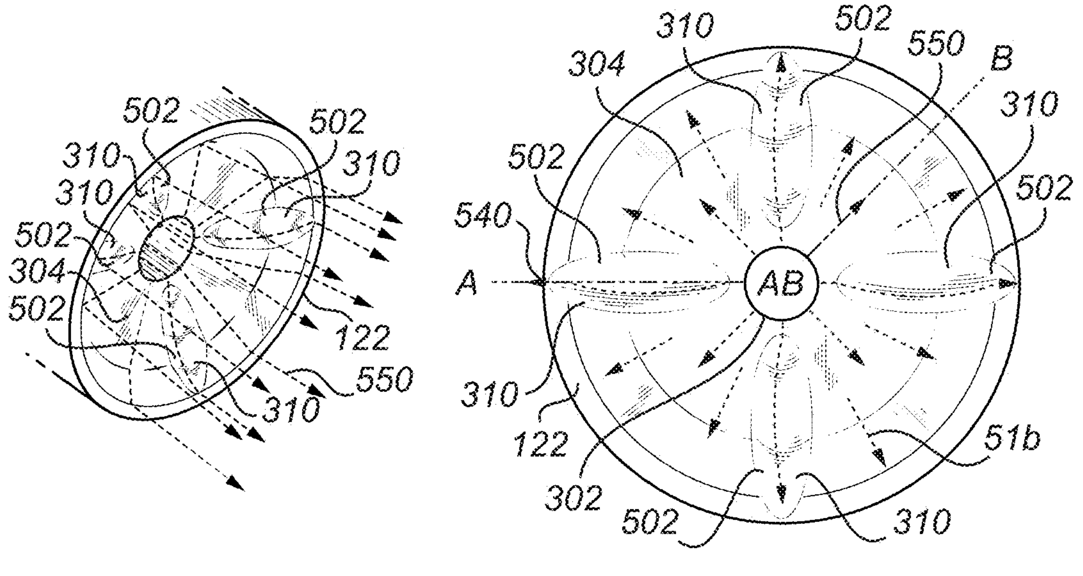

In order to describe a further example of the surface discontinuing portion 310, reference is made to FIGS. 5A and 5B which illustrate the surface discontinuing portion 310 from different views. In particular, FIG. 5A is a cross-sectional view of the cavity while FIG. 5B is a perspective view as well as a view from below illustrating the cavity as seen from the combustion chamber. In the example depicted in FIGS. 5A and 5B, the surface discontinuing portion 310 is formed by a plurality of recess 502 arranged in the cavity side wall 304. In detail, the recesses 502 are arranged in the interface between the cylinder head surface 122 and the cavity side wall 304, i.e., the recesses are arranged in a portion of the cylinder head surface 122 and the cavity side wall 304. In some embodiments, each of the recesses extends from the cylinder head surface 122 in a direction towards the inner cavity surface 302. As can be seen in FIGS. 5A and 5B, the plurality of recesses is evenly distributed in the circumferential direction of the cavity side wall, wherein each of the recesses interrupts the circumferential surface distribution of the cavity side wall 304.

In the example depicted in FIGS. 5A and 5B, a portion 540 of the hydrogen gas 51*b* injected from the fuel injector 101, by opening a valve 560, will be guided towards the combustion chamber via the plurality of recesses 502, while a remaining portion 550 of the hydrogen gas 51*b* will flow along the cavity side wall 304. In further detail, FIGS. 5A-5B illustrate section A-A including one of the plurality of recesses 502, and a section B-B free from recesses. FIG. 5A illustrates these two sections in one and the same figure. Hereby, the flow of hydrogen gas can be guided in a desired manner into the combustion chamber. In the specific example, the portion 540 of hydrogen gas 51*b* guided via the plurality of recesses 502 can be directed at a wider area compared to the use of a non-recessed cavity. Further, although the recesses 502 in FIGS. 5A-5B are illustrated as extending solely in the axial and radial directions, it should be readily understood that the recesses 502 may also comprise a circumferential direction component such that the recesses extend in the axial, radial and circumferential directions.

Figure 6A:
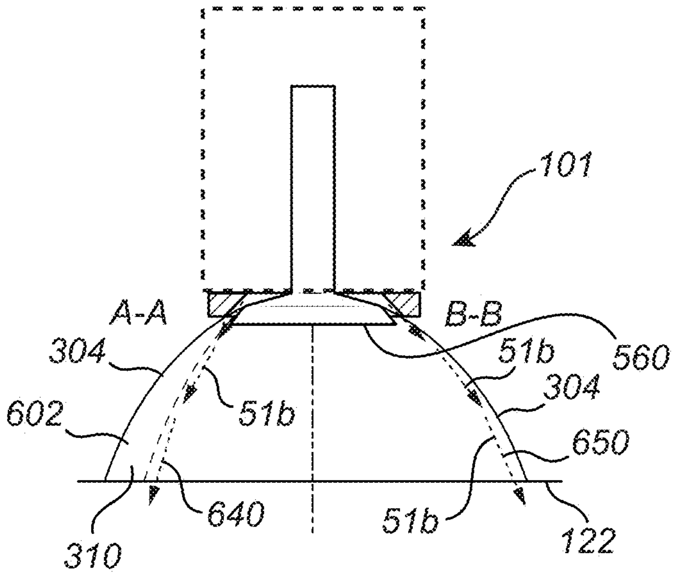
FIGS. 6A-6B is a schematical example of a surface discontinuing portion in the form of protrusions seen in various views.
Figure 6B:
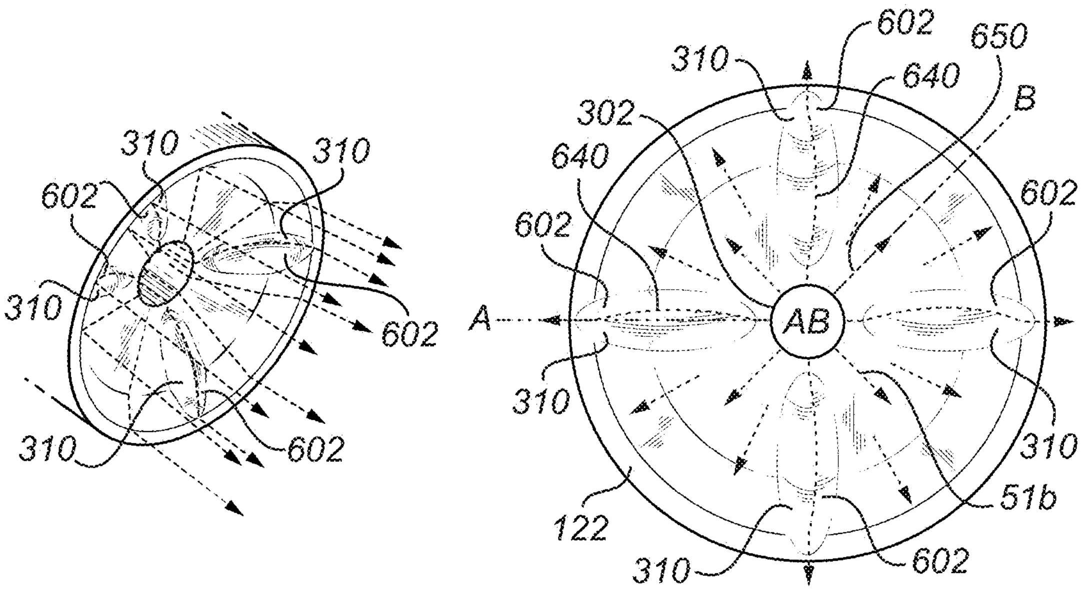

In order to describe a yet further example of the surface discontinuing portion 310, reference is made to FIGS. 6A and 6B which illustrate the surface discontinuing portion 310 from different views. In particular, FIG. 6A is a cross-sectional view of the cavity while FIG. 6B is a perspective view as well as a view from below illustrating the cavity as seen from the combustion chamber. In the example depicted in FIGS. 6A and 6B, the surface discontinuing portion 310 is formed by a plurality of protrusions 602 arranged in the cavity side wall 304. In detail, the protrusions 602 are arranged in the interface between the cylinder head surface 122 and the cavity side wall 304, i.e., the protrusions are arranged in a portion of the cylinder head surface 122 and the cavity side wall 304. In some embodiments, each of the protrusions extends from the cylinder head surface 122 in a direction towards the inner cavity surface 302. As can be seen in FIGS. 6A and 6B, the plurality of protrusions is evenly distributed in the circumferential direction of the cavity side wall, wherein each of the protrusions interrupts the circumferential surface distribution of the cavity side wall 304.

In the example depicted in FIGS. 6A and 6B, a portion 640 of the hydrogen gas 51*b* injected from the fuel injector 101, by opening a valve 560, will be guided towards the combustion chamber via the plurality of protrusions 602, while a remaining portion 650 of the hydrogen gas 51*b* will flow along the cavity side wall 304. In further detail, FIGS. 6A-6B illustrate section A-A including one of the plurality of protrusions 602, and a section B-B free from recesses. FIG. 6A illustrates these two sections in one and the same figure. Hereby, the flow of hydrogen gas can be guided in a desired manner into the combustion chamber. In the specific example, the portion 640 of hydrogen gas 51*b* guided via the plurality of protrusions 602 can be directed at a smaller area compared to the use of a non-recessed cavity. Further, although the protrusions 602 in FIGS. 6A-6B are illustrated as extending solely in the axial and radial directions, it should be readily understood that the protrusions 602 may also comprise a circumferential direction component such that the protrusions extend in the axial, radial and circumferential directions.

Figure 7:
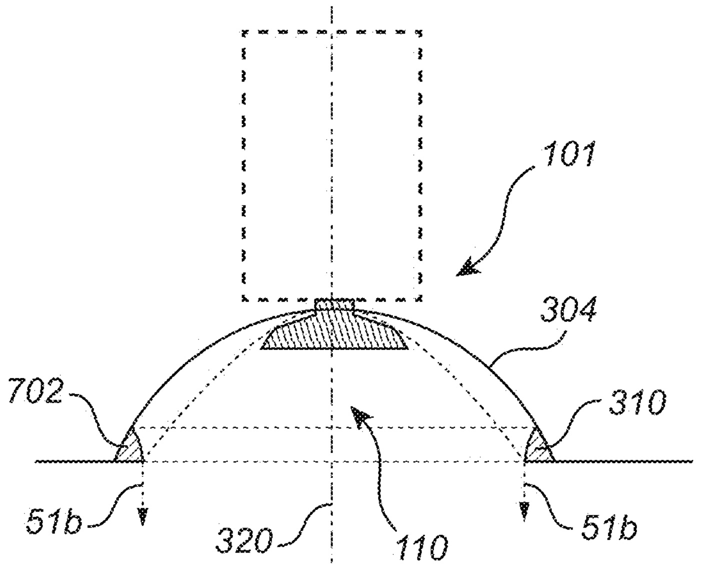
FIG. 7 is a schematical example of a surface discontinuing portion according to another example.

In order to describe the cavity 110 according to yet another example, reference is made to FIG. 7. As can be seen, the cavity side wall 304 comprises a surface discontinuing portion 310. The surface discontinuing portion 310 in FIG. 7 is exemplified as a protrusion 702 extending 360 degrees at the cavity side wall, i.e., around the entire circumferential direction of the cavity side wall 304. In detail, the protrusion 702 is arranged at an interface between the cylinder head surface 122 and the inner cavity surface 304 and extends towards a center portion of the cavity 110, i.e., towards the center axis 320. Further, to not interfere with the piston reciprocating in the combustion cylinder, the protrusion is flush with the cylinder head surface 122.

A portion of the hydrogen gas 51*b* injected from the fuel injector 101 will be interrupted by the protrusion 702.

Hereby, the hydrogen gas injected from the fuel injector 101 will be guided to a smaller area within the combustion chamber compared to a cavity without a protrusion 702.

Figure 8:
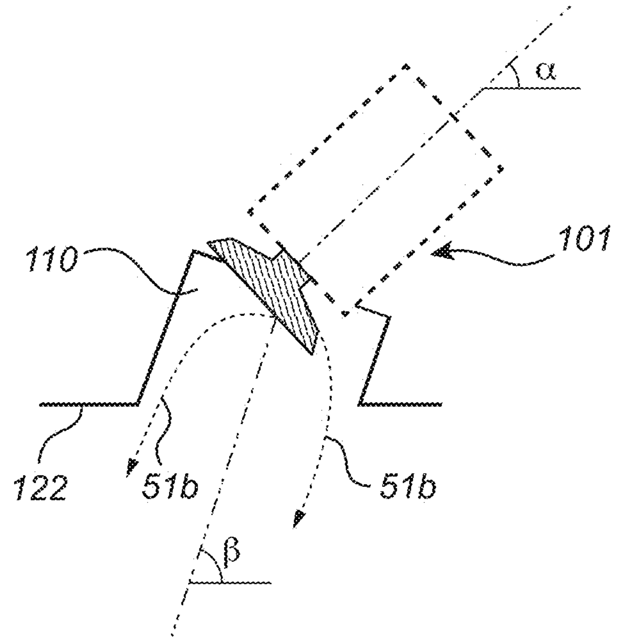
FIG. 8 is a schematical example of a fuel injector position in the cavity.

The cavity 110 as well as the fuel injector 101 may be arranged in different angular positions relative to e.g., the cylinder head surface 122 and reference is now made to FIG. 8 which illustrates one example. As can be seen in FIG. 8, the fuel injector 101 is arranged at an angle $\alpha$ relative to the cylinder head surface 122 and the cavity 110 extends at an angle $\beta$ relative to the cylinder head surface 122.

In the example depicted in FIG. 8, the angle $\alpha$ and the angle $\beta$ are different from each other and are both less than 90 degrees. The hydrogen gas 51*b* injected from the fuel injector 101 can here be guided in a specific manner which may be desirable for certain types of internal combustion processes. However, and according to another example, the angle $\alpha$ may be equal to 90 degrees, while the angle $\beta$ is less than 90 degrees. In such case, only the cavity is angled relative to the cylinder head surface 122. According to yet another example, the angles $\alpha$ and $\beta$ may be less than 90 degrees and at a same angle. Hereby, the fuel injector 101 as well as the cavity are angled relative to the cylinder head surface 122 and aligned with each other.

EXAMPLE LIST

Example 1: A cylinder head configured to mount to a combustion cylinder of an internal combustion engine, ICE, the cylinder head comprising a cylinder head surface configured to face an internal combustion chamber of the combustion cylinder, a cavity comprising an inner cavity surface and a cavity side wall, the cavity extending from the cylinder head surface, along the cavity side wall, to the inner cavity surface in a direction away from the cylinder head surface, and an opening arranged in the inner cavity surface, the opening being configured to be provided with a fuel injector for feeding gaseous fuel into the combustion chamber, wherein the cavity side wall comprises a surface discontinuity portion, the surface discontinuity portion being arranged at a distance from the inner cavity surface.

Example 2: The cylinder head of example 1, wherein an envelope surface of the cavity side wall extends 360 degrees in a circumferential direction.

Example 3: The cylinder head of any one of examples 1 or 2, wherein the surface discontinuity portion is integrated with the cavity side wall.

Example 4. The cylinder head of any one of the preceding examples, wherein the surface discontinuing portion comprises a protrusion.

Example 5. The cylinder head of example 4, wherein the protrusion is arranged at an interface between the cylinder head surface and the inner cavity surface, the protrusion extending towards a center portion of the cavity.

Example 6. The cylinder head of any one of examples 4-5, wherein the protrusion extends in 360 degrees at the cavity side wall.

Example 7. The cylinder head of any one of examples 4-6, wherein the protrusion is flush with the cylinder head surface.

Example 8. The cylinder head of any one of examples 4-6, wherein the protrusion is arranged at a non-zero distance from the cylinder head surface.

Example 9. The cylinder head of any one of examples 1-3, wherein the surface discontinuity portion comprises at least one recess arranged in the cavity side wall.

Example 10. The cylinder head of examples 9, wherein the at least one recess comprises a plurality of recesses.

Example 11. The cylinder head of examples 10, wherein the recesses of the plurality of recesses are evenly distributed in the circumferential direction of the cavity side wall.

Example 12. The cylinder head of any one of examples 9-11, wherein the recess extends from the cylinder head surface in a direction towards the inner cavity surface.

Example 13. The cylinder head of any one of the preceding examples, wherein the cavity is arranged at a center of the cylinder head surface.

Example 14. The cylinder head of any one of the preceding examples, wherein the cavity comprises a circular cross-section.

Example 15. The cylinder head of any one of the preceding examples, wherein the cylinder head is a hydrogen internal combustion engine cylinder head.

Example 16. An internal combustion engine, ICE, comprising a combustion cylinder housing a reciprocating piston, a cylinder head according to any one of the preceding examples, the cylinder head being mounted to the combustion cylinder, and a fuel injector arranged at inner cavity surface of the cavity.

Example 17. The internal combustion engine of example 16, wherein the internal combustion engine is a hydrogen internal combustion engine.

Example 18. A vehicle, comprising an internal combustion engine according to any one of examples 16 or 17.

Example 19. The vehicle according to example 18, further comprising a gas tank configured to contain hydrogen gas, wherein the gas tank is arranged in fluid communication with the fuel injector.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A cylinder head configured to mount to a combustion cylinder of an internal combustion engine the cylinder head comprising:

a cylinder head surface configured to face an internal combustion chamber of the combustion cylinder, a cavity comprising an inner cavity surface and a cavity side wall, the cavity extending from the cylinder head surface, along the cavity side wall, to the inner cavity surface in a direction away from the cylinder head surface, and an opening arranged in the inner cavity surface, the opening being configured to be provided with a fuel injector for feeding gaseous fuel into the combustion chamber, wherein the cavity side wall comprises a surface discontinuity portion, the surface discontinuity portion being arranged at a distance from the inner cavity surface, wherein the surface discontinuity portion comprises at least one recess arranged in the cavity side wall, wherein the at least one recess comprises a plurality of recesses.

2. The cylinder head of claim 1, wherein an envelope surface of the cavity side wall extends 360 degrees in a circumferential direction.

3. The cylinder head of claim 1, wherein the surface discontinuity portion is integrated with the cavity side wall.

4. The cylinder head of claim 1, wherein the surface discontinuing portion comprises a protrusion.

5. The cylinder head of claim 4, wherein the protrusion is arranged at an interface between the cylinder head surface and the inner cavity surface, the protrusion extending towards a center portion of the cavity.

6. The cylinder head of claim 4, wherein the protrusion extends in 360 degrees at the cavity side wall.

7. The cylinder head of claim 4, wherein the protrusion is flush with the cylinder head surface.

8. The cylinder head of claim 4, wherein the protrusion is arranged at a non-zero distance from the cylinder head surface.

9. The cylinder head of claim 1, wherein the recesses of the plurality of recesses are evenly distributed in the circumferential direction of the cavity side wall.

10. The cylinder head of claim 1, wherein the recess extends from the cylinder head surface in a direction towards the inner cavity surface.

11. An internal combustion engine comprising a combustion cylinder housing a reciprocating piston, a cylinder head according to claim 1, the cylinder head being mounted to the combustion cylinder, and a fuel injector arranged at inner cavity surface of the cavity.

12. The internal combustion engine of claim 11, wherein the internal combustion engine is a hydrogen internal combustion engine.

13. A vehicle, comprising an internal combustion engine according to claim 11.

* * * * *